(12) United States Patent
Hickenlooper et al.

(10) Patent No.: US 12,111,628 B2
(45) Date of Patent: *Oct. 8, 2024

(54) SYSTEMS, METHODS, AND APPARATUSES FOR ADAPTIVE IRRIGATION ZONE CONTROL USING PRESSURE, TIME, FLOW, AND PREDICTED BEHAVIOR

(71) Applicant: Baseline, Inc., Boise, ID (US)

(72) Inventors: Franklin Timothy Hickenlooper, Eagle, ID (US); Christopher Leon Swenson, Meridian, ID (US); Tige H. Fiedor, Meridian, ID (US)

(73) Assignee: Baseline, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/449,582

(22) Filed: Aug. 14, 2023

(65) Prior Publication Data

US 2024/0053719 A1 Feb. 15, 2024

Related U.S. Application Data

(63) Continuation of application No. 17/466,969, filed on Sep. 3, 2021, now Pat. No. 11,726,444, which is a (Continued)

(51) Int. Cl.
*G05B 19/048* (2006.01)
*A01G 25/16* (2006.01)
(Continued)

(52) U.S. Cl.
CPC ......... *G05B 19/048* (2013.01); *A01G 25/165* (2013.01); *F15B 19/005* (2013.01);
(Continued)

(58) Field of Classification Search
CPC .......... G05B 19/048; G05B 2219/2625; G05B 19/042; A01G 25/165; A01G 25/162;
(Continued)

(56) References Cited

U.S. PATENT DOCUMENTS 10,166,565 B2 1/2019 Lemkin
11,112,764 B2 * 9/2021 Hickenlooper ....... H04L 1/0026
(Continued)

*Primary Examiner* — Charles R Kasenge
(74) *Attorney, Agent, or Firm* — Stoel Rives LLP

(57) ABSTRACT

An adaptive hydraulic control system controls irrigation system zones using predicted valve behavior, measured pressure, recovery time, and measured flow. A pressure sensor can measure a pressure in a water line and a flow meter can measure a flow rate in the water line. The adaptive hydraulic control system monitors the pressure and the flow rate, and determines when the pressure and the flow rate are above and below target operational thresholds. When the pressure is determined to be below a minimum target threshold or the flow rate is determined to be above a maximum target threshold, the adaptive hydraulic control system identifies one or more valves in an opened position of the plurality of valves that when closed would cause the pressure and the flow rate to return within the target operational thresholds. The adaptive hydraulic control system provides instructions to change a position of the one or more identified valves.

20 Claims, 6 Drawing Sheets

Related U.S. Application Data continuation of application No. 16/533,535, filed on Aug. 6, 2019, now Pat. No. 11,112,764.

(60) Provisional application No. 62/715,184, filed on Aug. 6, 2018.

(51) Int. Cl.
| | |
|---|---|
| *F15B 19/00* | (2006.01) |
| *H04L 1/00* | (2006.01) |
| *H04L 5/00* | (2006.01) |
| *H04L 5/10* | (2006.01) |
| *H04W 56/00* | (2009.01) |
| *H04W 72/30* | (2023.01) |
| *H04W 72/53* | (2023.01) |
| *H04W 76/27* | (2018.01) |
| *H04W 80/02* | (2009.01) |

(52) U.S. Cl.
CPC .......... *H04L 1/0026* (2013.01); *H04L 5/0051* (2013.01); *H04L 5/10* (2013.01); *H04W 56/001* (2013.01); *H04W 72/30* (2023.01); *H04W 72/53* (2023.01); *H04W 76/27* (2018.02); *H04W 80/02* (2013.01); *G05B 2219/2625* (2013.01)

(58) Field of Classification Search
CPC .... F15B 19/005; H04L 1/0026; H04L 5/0051; H04L 5/10; H04W 56/001; H04W 72/30; H04W 72/53; H04W 76/27; H04W 80/02; Y02A 40/22

See application file for complete search history.

(56) References Cited

U.S. PATENT DOCUMENTS

| | | | |
|---|---|---|---|
| 11,726,444 B2 * | 8/2023 | Hickenlooper | H04W 72/53 370/329 |
| 2002/0002425 A1 | 1/2002 | Dossey et al. | |
| 2008/0251601 A1 | 10/2008 | Nies et al. | |
| 2016/0324084 A1 | 11/2016 | Whalley | |
| 2017/0156273 A1 | 6/2017 | Whalley | |
| 2017/0359974 A1 | 12/2017 | Whalley | |
| 2017/0367277 A1 | 12/2017 | Mohindra | |
| 2018/0141069 A1 | 5/2018 | Lemkin | |
| 2019/0105679 A1 | 4/2019 | Lemkin | |
| 2020/0041970 A1 | 2/2020 | Hickenlooper et al. | |
| 2021/0400674 A1 | 12/2021 | Hickenlooper et al. | |

* cited by examiner

SYSTEMS, METHODS, AND APPARATUSES FOR ADAPTIVE IRRIGATION ZONE CONTROL USING PRESSURE, TIME, FLOW, AND PREDICTED BEHAVIOR

RELATED APPLICATIONS

This application is a continuation of U.S. patent application Ser. No. 17/466,969, titled SYSTEMS, METHODS, AND APPARATUSES FOR ADAPTIVE IRRIGATION ZONE CONTROL USING PRESSURE, TIME, FLOW, AND PREDICTED BEHAVIOR, filed Sep. 3, 2021, which is a continuation of U.S. patent application Ser. No. 16/533,535, filed Aug. 6, 2019, which claims priority to United States Provisional Patent Application No. 62/715,184, filed Aug. 6, 2018, each of which is incorporated herein by reference in their entirety.

TECHNICAL FIELD

The present disclosure is directed to systems, methods, and apparatuses for controlling of an irrigation system, and more particularly for adaptively controlling the irrigation system zones using predicted valve behavior, measured pressure, recovery time, and measured flow.

BRIEF DESCRIPTION OF THE DRAWINGS

Non-limiting and non-exhaustive embodiments of the disclosure are described herein, including various embodiments of the disclosure with reference to the figures listed below.

DETAILED DESCRIPTION

Figure 1:
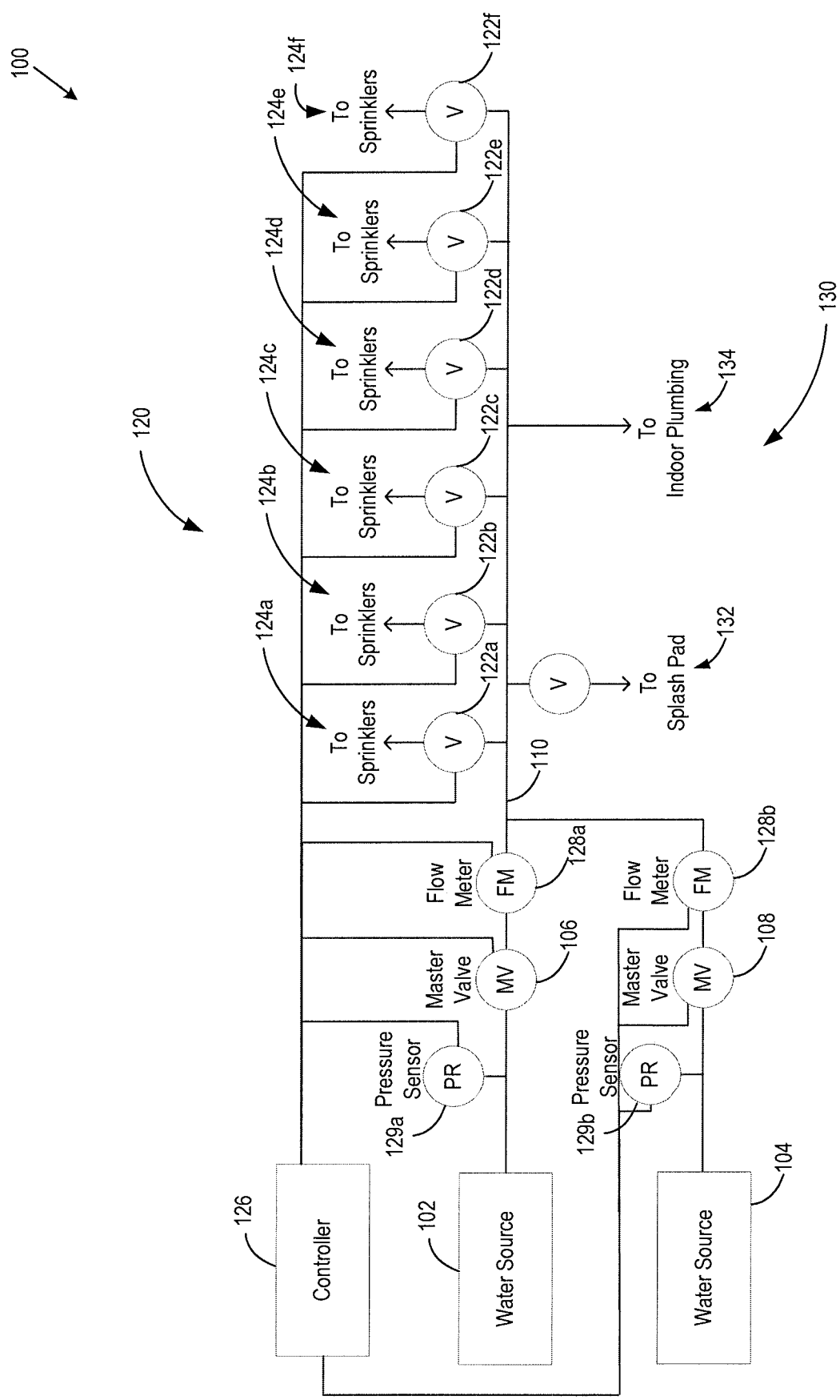
FIG. 1 is a block diagram of a hydraulic system with a controller configured to adaptively direct water to irrigation zones based on pressure, flow rate, time, and predicted behavior, according to one embodiment.

Described herein are systems, methods, and apparatuses for adaptively controlling irrigation zones based on pressure and flow measurements. A hydraulic control system may monitor pressure and flow rate of water within a line and change which irrigation zones are in operation based on a predicted flow rate and a predicted pressure. The hydraulic control system may change irrigation zones within a hydraulic system to cause the pressure and flow rate be within a target operational range.

Efficiently using an irrigation system involves determining a number of valves to activate and deactivate to maximize water usage, prevent system damage, and maintain sufficient water flow and pressure for valves in operation. Properly timing the activation and deactivation of valves may save money and water. Additionally, timing the activation and deactivation of valves may reduce damage to the system (e.g., water hammer damage). Poorly controlled irrigation systems may cause damage, prolong watering times, and cause poor water distribution.

For example, making too many valve state changes too quickly can damage the hydraulic system. Water hammer causes a pressure surge within a hydraulic system when moving water is forced to stop or change direction suddenly. Water hammer can break pipes, which may result in serious water erosion damage and water loss. Changing too many valves on or off at a time can cause water hammer. Water hammer becomes more of a problem the longer the pipe runs become.

Timing the valve state changes incorrectly may cause the hydraulic system to malfunction. For example, trying to turn on and off groups of valves at the same time can cause stuck valves, very long valve turn off times, and incomplete valve on states. This can overtax water sources.

Additionally, having too many or too few of valves in an on state may cause a hydraulic system to operate inefficiently. For example, too many active valves can drop water pressure, causing poor water distribution. Poor water distribution can result in dehydration and death of plants that the hydraulic system is supposed to water. Too few active valves will use less water resources than available, which can extend the time to complete watering, resulting in extended watering windows to undesirable times (e.g., heat of the day, park open times, etc.). Valves have different sprinkler heads and counts and each use a different water flow to water properly. Determining which zones to run can be a complex calculation and a manual scheduling nightmare.

Some hydraulic control systems schedule valve operations to attempt to maximize water usage, prevent system damage, and maintain sufficient water flow and pressure for valves in operation. However, the schedule is based on an estimation pressure and flow rate of a water supply and the pressure and flow rate associated with each zone. If the estimation is off, the pressure and flow rate of the water supply may be insufficient for scheduled watering. Alternatively, the watering time may be prolonged if the watering schedule does not use the maximum available water from the water supply.

Additionally, a scheduled system does not take changes of the hydraulic system into consideration. For example, an irrigation zone of the hydraulic system may have a portion of a pipe replaced with a smaller diameter pipe. The smaller diameter pipe would change the estimated drop in water flow and pressure associated with the irrigation zone operation. Further, the scheduled system does consider dynamic changes in water flow. For example, a water source may provide water at varying levels of pressure and flow rate. Additionally, some hydraulic systems may include equipment that uses water resources at unscheduled times. For example, a hydraulic system may include indoor plumbing (e.g., showers, toilets, sinks), recreational equipment (e.g., splash pad, mister), a water feature, and/or a hose. This unscheduled equipment may reduce the pressure and flow rate of the available water, possibly causing a drop in water pressure, thereby causing poor water distribution.

Disclosed herein are embodiments of hydraulic control systems to adaptively control a hydraulic system based on pressure, flow rate, time, and predicted behavior to maximize water usage, prevent system damage, and maintain sufficient water flow and pressure for valves in operation. A hydraulic control system may monitor the pressure and the flow rate and determine when the pressure and the flow rate are within a target operational range. For example, the hydraulic control system may monitor if the pressure is above or below a minimum target threshold and if the flow rate is above or below a maximum target threshold. In some embodiments, when the pressure and the flow rate are determined to be within a target operational range, a hydraulic control system identifies one or more valves in a closed position of the plurality of valves that when opened would cause the pressure and the flow rate to be maintained within a target operational range. In some embodiments, when the pressure and the flow rate are determined to be outside a target operational range, the hydraulic control system identifies one or more valves in an opened position of the plurality of valves that when closed would cause the pressure and the flow rate to return to within a target operational range. The hydraulic control system may provide instructions to change a position of the one or more identified valves (e.g., open closed valves, and close opened valves).

For example, the target operational range may include a minimum target threshold for pressure and a maximum target threshold for flow rate. The hydraulic control system may determine when the pressure is above and below a minimum target threshold and when the flow rate is above and below a maximum target threshold. When the pressure and the flow rate are determined to be above a minimum target threshold and the flow rate is determined to be below the maximum target threshold, the hydraulic control system may identify one or more valves in a closed position of the plurality of valves that when opened would cause the pressure to be maintained above the minimum target threshold and the flow rate to be maintained below the maximum target threshold. When the pressure is determined to be below a minimum target threshold or the flow rate is determined to be above the maximum target threshold, the hydraulic control system may identify one or more valves in an opened position of the plurality of valves that when closed would cause the pressure to increase above the minimum target threshold or the flow rate to be reduced below the maximum target threshold;

Additional details and examples are provided with reference to the figures below. Generally speaking, the systems and methods disclosed herein may be adapted to interface with or be included as part of a software program for hydraulic systems.

The phrases "connected to" and "in communication with" refer to any form of interaction between two or more components, including mechanical, electrical, magnetic, and electromagnetic interaction. Two components may be connected to each other, even though they are not in direct contact with each other, and even though there may be intermediary devices between the two components.

Some of the infrastructure that can be used with embodiments disclosed herein is already available, such as: general-purpose computers, computer programming tools and techniques, digital storage media, and communications networks. A computer may include a processor, such as a microprocessor, microcontroller, logic circuitry, or the like. The processor may include a special-purpose processing device, such as an ASIC, PAL, PLA, PLD, FPGA, or other customized or programmable device. The computer may also include a computer-readable storage device, such as a non-volatile memory, static RAM, dynamic RAM, ROM, CD-ROM, disk, tape, magnetic memory, optical memory, flash memory, or another computer-readable storage medium.

Suitable networks for configuration and/or use, as described herein, include any of a wide variety of network infrastructures. Specifically, a network may incorporate landlines, wireless communication, optical connections, various modulators, demodulators, small form-factor pluggable (SFP) transceivers, routers, hubs, switches, and/or other networking equipment. The network may include communications or networking software, such as software available from Novell, Microsoft, Artisoft, and other vendors, and may operate using UDP, TCP/IP, SPX, IPX, SONET, and other protocols over twisted pair, coaxial, or optical fiber cables; telephone lines; satellites; microwave relays; modulated AC power lines; physical media transfer; wireless radio links; and/or other data transmission "wires." The network may encompass smaller networks and/or be connectable to other networks through a gateway or similar mechanism.

Aspects of certain embodiments described herein may be implemented as software modules or components. As used herein, a software module or component may include any type of computer instruction or computer-executable code located within or on a computer-readable storage medium, such as a non-transitory computer-readable storage medium. A software module may, for instance, comprise one or more physical or logical blocks of computer instructions, which may be organized as a routine, program, object, component, data structure, etc., that perform one or more tasks or implement particular data types, algorithms, and/or methods.

A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments.

FIG. 1 is a block diagram of a hydraulic system 100 with a controller 126 configured to adaptively direct water to irrigation zones based on pressure, flow rate, time, and predicted behavior. The hydraulic system 100 may include an irrigation system 120 and additional non-irrigation equipment 130. The hydraulic system 100 draws water from one or more water sources (e.g., a first water source 102 and a second water source 104). One or more master valves (e.g., a first master valve 106 and a second master valve 108) control the flow of water from the first water source 102 and the second water source 104 to a water line 110.

The additional non-irrigation equipment 130 includes components that use water and are not controlled by the controller 126. For example, in the illustrated embodiment, the additional non-irrigation equipment 130 includes a splash pad 132 and indoor plumbing 134. The additional non-irrigation equipment 130 may consume water at unscheduled periods, making the available water have an unexpected drop in pressure and increase in flow rate.

In the illustrated embodiment, the irrigation system 120 comprises a plurality of valves (i.e., a first valve 122a, a second valve 122b, a third valve 122c, a fourth valve 122d, a fifth valve 122e, and a sixth valve 122f, herein collectively referred to as valves 122), a plurality of sprinklers (i.e., a first set of sprinklers 124a, a second set of sprinklers 124b, a third set of sprinklers 124c, a fourth set of sprinklers 124d, a fifth set of sprinklers 124e, and a sixth set of sprinklers 124f, herein collectively referred to as sprinklers 124), the controller 126, two flow meters (i.e., a first flow meter 128a and a second flow meter 128b, herein collectively referred to as flow meters 128), and two pressure sensors (i.e., a first pressure sensor 129a and a second pressure sensor 129b, herein collectively referred to as pressure sensors 129).

The hydraulic system 100 may comprise a hydraulic control system that includes a controller 126 that is in communication with the valves 122, and may direct the water to one or more zones to water plants by adjusting the state (e.g., open or closed) of one or more of the valves 122. If a valve is open, water flows through the valve to the sprinklers associated with that valve. When a valve is closed, the water is prevented from flowing to the sprinklers associated with that valve. The controller 126 may also control the water flow from the water sources. For example, in some embodiments, the controller 126 may control the position of the master valves. In some embodiments, the controller 126 may control a pump that draws water from a water source such as a pond or a well.

In the illustrated embodiment, the controller 126 also receives measurements from the flow meters 128 and the pressure sensors 129. The controller 126 uses these measurements to determine what valves to turn on and off to maintain the pressure and flow rate in a target operational range for the irrigation system 120. The target operational range may define pressure and/or flow rate thresholds (i.e., target operational thresholds) defining target operational ranges. The pressure and flow rate target operational ranges may be set to ensure sufficient water distribution from the sprinklers 124. The controller 126 may close the valves 122 if the pressure or flow rate move outside the target operational ranges. Similarly, if the pressure and flow rate are within the target operational ranges the controller 126 may open additional valves 122 to maximize water usage to reduce the watering time. In some embodiments, a pressure sensor may be unavailable. In such embodiments, the pressure may be pre-set. For example, the pressure may be pre-set based on an initial pressure measurement, pressure standards for a water source, or manufacturer ratings for a pump.

Additionally, the controller 126 can factor in time when adjusting the states of valves. For example, the controller 126 may allow time for the pressure and flow rate to recover after a valve is turned on (recovery time) before making further adjustments. The recovery time may be a user or manufacturer set limit, or the hydraulic system 100 may measure actual recovery times for the valves under various conditions to define a time limit. For example, the actual recovery time may vary based on pressure, flow rate, and other valves open. The hydraulic system 100 may use the pressure sensors 129 and/or the flow meters 128 to determine when pressure and flow rate have stabilized. If the stable flow pressure or flow rate are outside target operational ranges, the system can reduce the flow by turning off one or more valves to return the system to its target operational ranges. If the pressure and flow rate do not obtain stability within the time limit, the zone associated with the valve may be identified as a faulty zone. The faulty zone can be isolated and not used in order to maintain acceptable flow and pressure to other valves, and the controller 126 may send a warning to a user about the faulty zone.

In some embodiments, the hydraulic system 100 can predict behavior of the water pressure and flow rate. In some embodiments, the hydraulic system 100 predicts a time of use of the additional non-irrigation equipment 130 that is unscheduled. For example, based on historical measurement data, the hydraulic system 100 may determine that the indoor plumbing 134 usually causes the pressure to drop by 5 PSI every morning at 7:00 AM for an occupant's shower. The hydraulic system 100 may predict this behavior and maintain the water pressure at 5 PSI above the minimum threshold near that time.

Additionally, in some embodiments, the hydraulic system 100 predicts changes in water pressure and flow rate for valve operations. The hydraulic system 100 gathers data during normal operation to make a profile of how the flow and pressure change as valves turn on and off. The profile may include recovery time for a given pressure, flow rate, and valve combination. In some embodiments, the profile may include pressure changes and flow rate changes associated with opening the valve with various valve combinations for a given pressure and flow rate. In some embodiments, the profile may include pressure changes and flow rate changes associated with closing the valve with various valve combinations for a given pressure and flow rate. The given pressure and flow rate is the pressure and flow rate before the valve is opened.

The profile for the valves may be updated as the hydraulic system 100 is used. For example, if a valve or combination of valves is opened and pressure changes and flow rate changes are different than an expected or projected change, the profile may be updated with the actual pressure changes and flow rate changes for that valve or combination of valves. Additionally, the profiles may be ranked based on effectiveness to deliver a predicted pressure and flow rate change. The effectiveness may be based on a difference between the predicted pressure and flow rate change and the measured pressure and flow rate.

The hydraulic system 100 may analyze the profile data, and apply the profiles during the next run to adjust valve groups based on predicted values of flow and pressure. In some embodiments, if two or more valve group adjustments may result in a desired pressure and flow rate change, the hydraulic system 100 may apply an adjustment associated with a profile with the highest ranked effectiveness. The hydraulic system 100 can use actual measurements to dynamically alter current valve operations and update the profile data if the predicted behavior did not occur. Before the hydraulic system 100 obtains measurements and creates profiles for the valves, the hydraulic system 100 does calculations for predicted flow and pressure based initially on a mathematical model, but adjusts over time based on learned data to better represent and track the actual measured values. For example, the hydraulic system 100 may alter coefficients for the calculations based on measured recovery time, measured pressure changes, measured flow rate changes, and current combination of open and closed valves.

Figure 2:
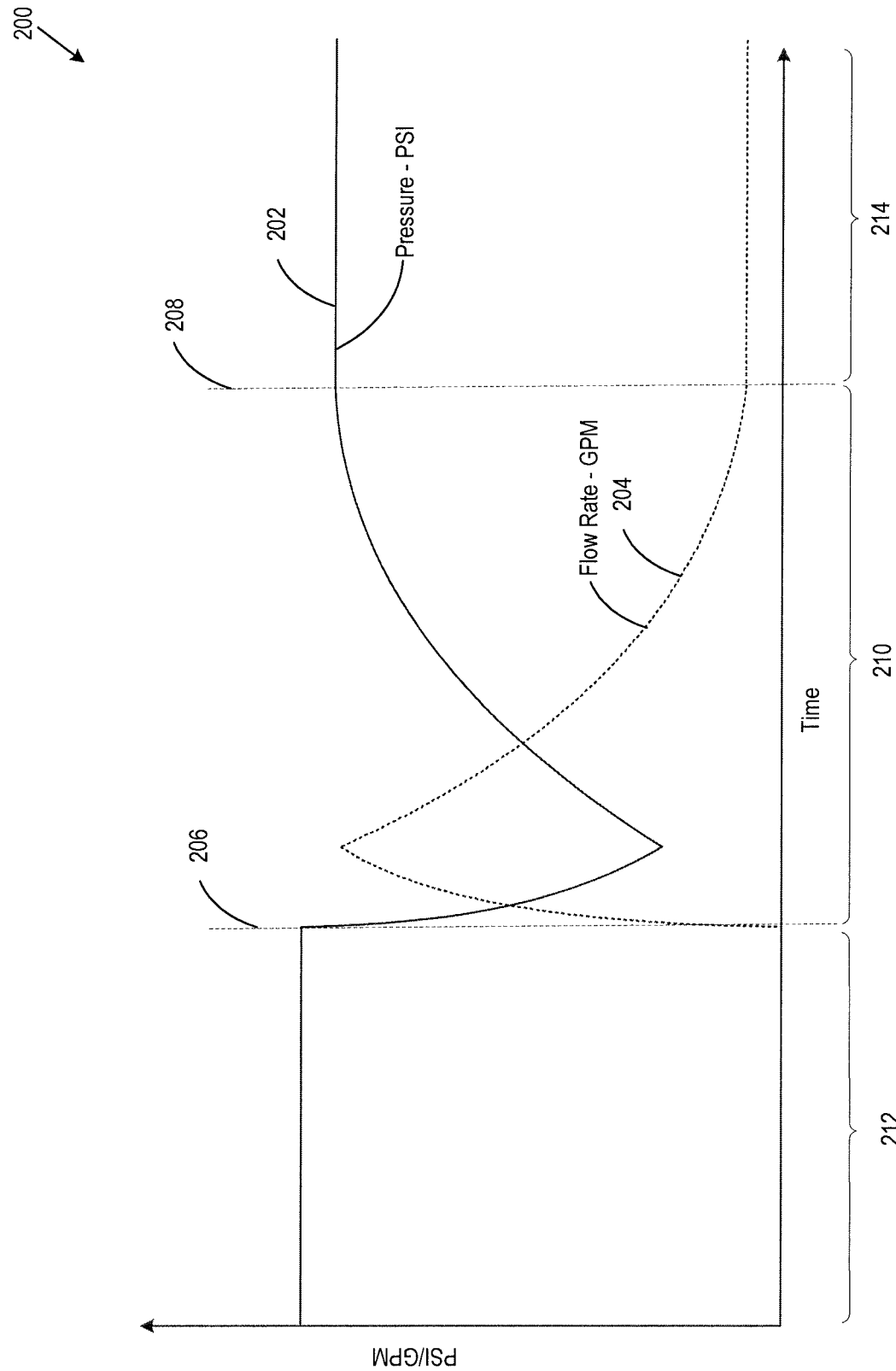
FIG. 2 is a graph illustrating the relationship between pressure and flow rate as a valve turns on and fills the lines in the zone associated with the valve to supply water to the sprinklers, according to one embodiment.

FIG. 2 is a graph 200 illustrating the relationship between pressure 202 and flow rate 204 as a valve turns on and fills the lines in the zone associated with the valve to supply water to the sprinklers. The time to fill the pipe can simply be an estimated fill time. This time between the valve action 206 and the stabilization time 208 is referred to herein as a recovery period 210. However, the estimation may be inaccurate. For example, long pipes and interesting pipe topologies and routes make recovery time estimating problematic.

Each time a valve is turned on there is a corresponding drop in pressure and increase in flow that will stabilize once the lateral sprinkler pipe is full, or there is no air in the pipes. Estimating the recovery period 210 for each valve could be both difficult and different for each valve and set of sprinklers. Similarly, each time a valve is turned off there will be a decrease in the flow, but not a drop in pressure. If the pressure drops while a valve is trying to turn off, it may get stuck or take a very long time to shut off. Most irrigation valves require a significant pressure differential across them to turn on and stable pressure to turn off.

Rather than estimating the recovery period 210, a more accurate time can be achieved using pressure 202 and flow rate 204 readings. The pressure 202 and flow rate 204 can be monitored as an indicator of valve open/close actions. The pressure and flow rate may have some dependency on the pipe diameter and length of pipe, but is something that can be learned by a hydraulic control system and used for future control decisions. For example, each valve can have a pressure 202, flow rate 204, and recovery period 210 profile logged over time to then accurately predict the behavior on the next on/off event. If the valve behaves differently than the profile, the hydraulic control system may use the difference to detect problems. If no problem is detected, the recovery period 210 for the profile may be updated. In some embodiments the profiles are step functions representing the flow rate/pressure/recovery time expectations that may be compared with the actual measurements. As shown, the pressure 202 after stabilization 214 may be less than the pressure 202 before the valve action 212, and flow rate 204 after stabilization may be higher than before the valve action 212. This change may be part of the profile.

The recovery period 210 may be determined by analyzing the flow rate 204 and/or pressure 202. In some embodiments, the valve action 206 is determined to be when a control signal was sent by a controller. In some embodiments, the valve action 206 may be determined to be when the slope of the flow rate 204 and/or pressure 202 becomes negative after accounting for variances in flow rate 204 and/or pressure 202. In some embodiments, the stabilization time 208 may be determined when the slope of the flow rate 204 and/or pressure 202 becomes relatively flat after accounting for variances in flow rate 204 and/or pressure 202.

Figure 3:
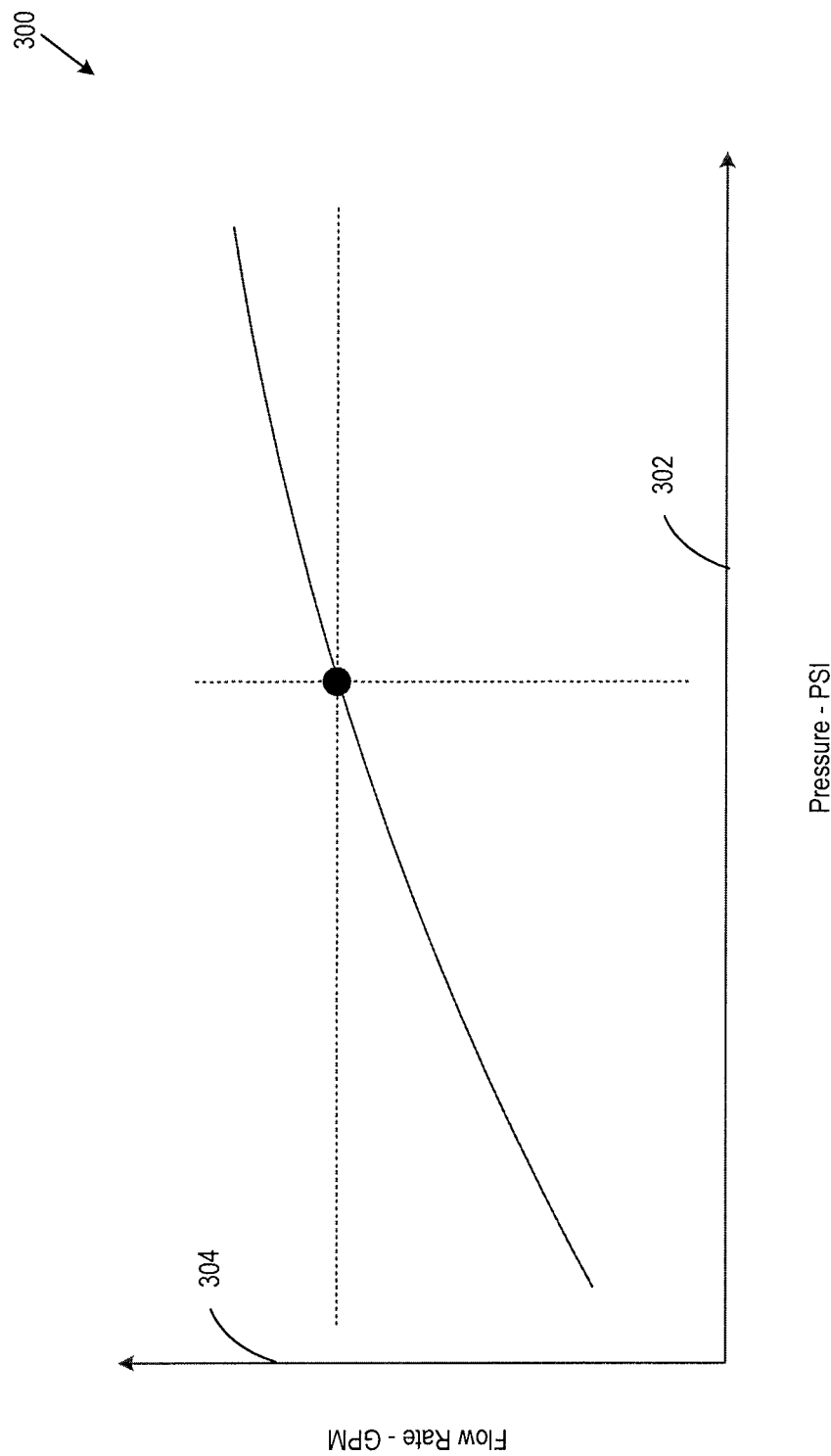
FIG. 3 is a graph illustrating a relationship between pressure and flow rate for a valve with sprinklers, according to one embodiment.

FIG. 3 is a graph 300 illustrating a relationship between pressure 302 and flow rate 304 for a valve with sprinklers. As the pressure 302 varies, the flow rate 304 used by the valve with sprinklers will also vary. If the pressure 302 is too low, the flow rate 304 will be insufficient to provide distribution uniformity by the sprinklers, resulting in dry areas and dead plants.

If the flow rate 304 for a zone is known at a single pressure point, then a hydraulic control system can calculate or predict an expected flow rate 304 at a different pressure point. The hydraulic control system can use this relationship between the flow rate 304 and the pressure 302 to accurately predict the total flow rate for a number of valves. The predicted total flow rate may be used to determine flow variance caused by some part failure (broken sprinkler head, pebble in a valve, etc.). For example, if the hydraulic control system compares the predicted flow rate 304 at a measured pressure 302 to a measured flow rate and the measured flow rate is less than the predicted flow rate 304, the hydraulic control system may send an alert to the user that there may be a blockage. In some embodiments, the user may indicate that there is no failure and the hydraulic control system may update a valve profile's relationship between the flow rate 304 and the pressure 302. Additionally, the recovery time may provide an indication of a failure so the system should not wait forever to get to a stable pressure and flow rate as a catastrophic failure may prevent stabilization.

Figure 4:
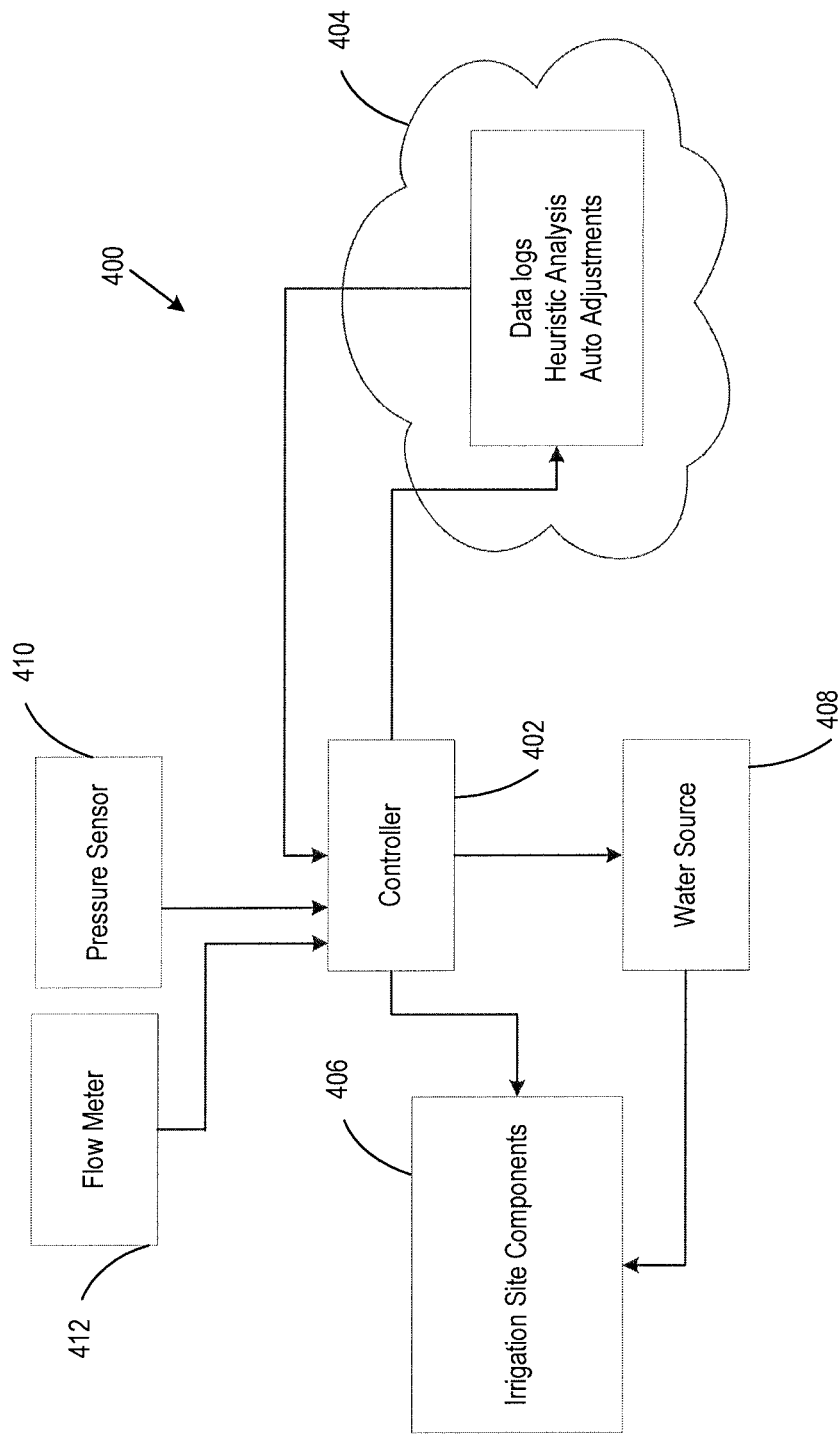
FIG. 4 is a network block diagram of a hydraulic control system, according to one embodiment.

FIG. 4 is a network block diagram of a hydraulic control system 400. In the illustrated embodiment, the hydraulic control system 400 comprises a controller 402 and an analytics server 404. A user sets boundary conditions via the controller or via a web or application interface with the analytics server 404. For example, a user may use a personal electronic device (e.g., laptop, cellphone, tablet) to interface with the analytics server. The boundary conditions may include minimum threshold for pressure, maximum threshold for flow rate, a maximum recovery time limit, scheduling limitations, and/or expected profiles for each valve (e.g., pressure change, flow rate change, recovery time).

The controller 402 controls irrigation site components 406 and the flow of water from a water source 408. For example, the controller 402 can provide a control signal to various valves to direct the flow of water from the water source 408 to select sprinklers. The controller 402 also receives measurements from a pressure sensor 410 and a flow meter 412 for pressure and flow rate of water in a line containing water from the water source. The controller 402 sends logs and gathered data to the analytics server 404 to be analyzed. The logs and gathered data may include the pressure and flow rate measurements and the valve states (e.g., on or off).

The analytics server 404 may save and analyze the logs and gathered data. A heuristic analysis may be used to determine recommendations for changes to valve positioning and to automatically implement changes that are within boundaries set by the user. The changes and new policies are sent to controller 402. For example, historical data can be analyzed to develop a predicted profile associated with each valve that includes the change in pressure and flow rate associated with turning the valve on or off. The profiles may be applied during the next run to adjust valve groups based on predicted values of flow and pressure. Current measurements can also be used to dynamically alter current valve operations to implement changes that are within boundaries set by the user if the predicted values are not accurate.

The analytics server 404 may update the profiles based on feedback from the controller 402. For example, the analytics server 404 may receive flow rate and pressure measurements and update the profile based on the measured values and based on the current conditions of the system (e.g., which valves are open, pressure available before opening a valve, type of water source, etc.). In some embodiments, the analytics server 404 may compare a predicted pressure and flow rate change for a valve or group of valves to a measured pressure and flow rate after the position of the valve or group of valves has changed to determine an effectiveness of the valve or group of valves. Effectiveness may be based on a difference between the predicted pressure and flow rate change and the measured pressure and flow rate. The effectiveness may become part of the profile, and the analytics server 404 may rank the profiles by effectiveness. The analytics server 404 may provide future recommendations for changes to valve positioning by determining which combination of valves has the highest ranked effectiveness for a desired pressure and flow rate change.

In some embodiments, the controller 402 is local with irrigation site components 406 and the water source 408, and the analytics server 404 is at a remote site. In some embodiments, the analytics server 404 is located near the controller 402. In some embodiments, the analytics server 404 is integrated with the controller 402.

Figure 5:
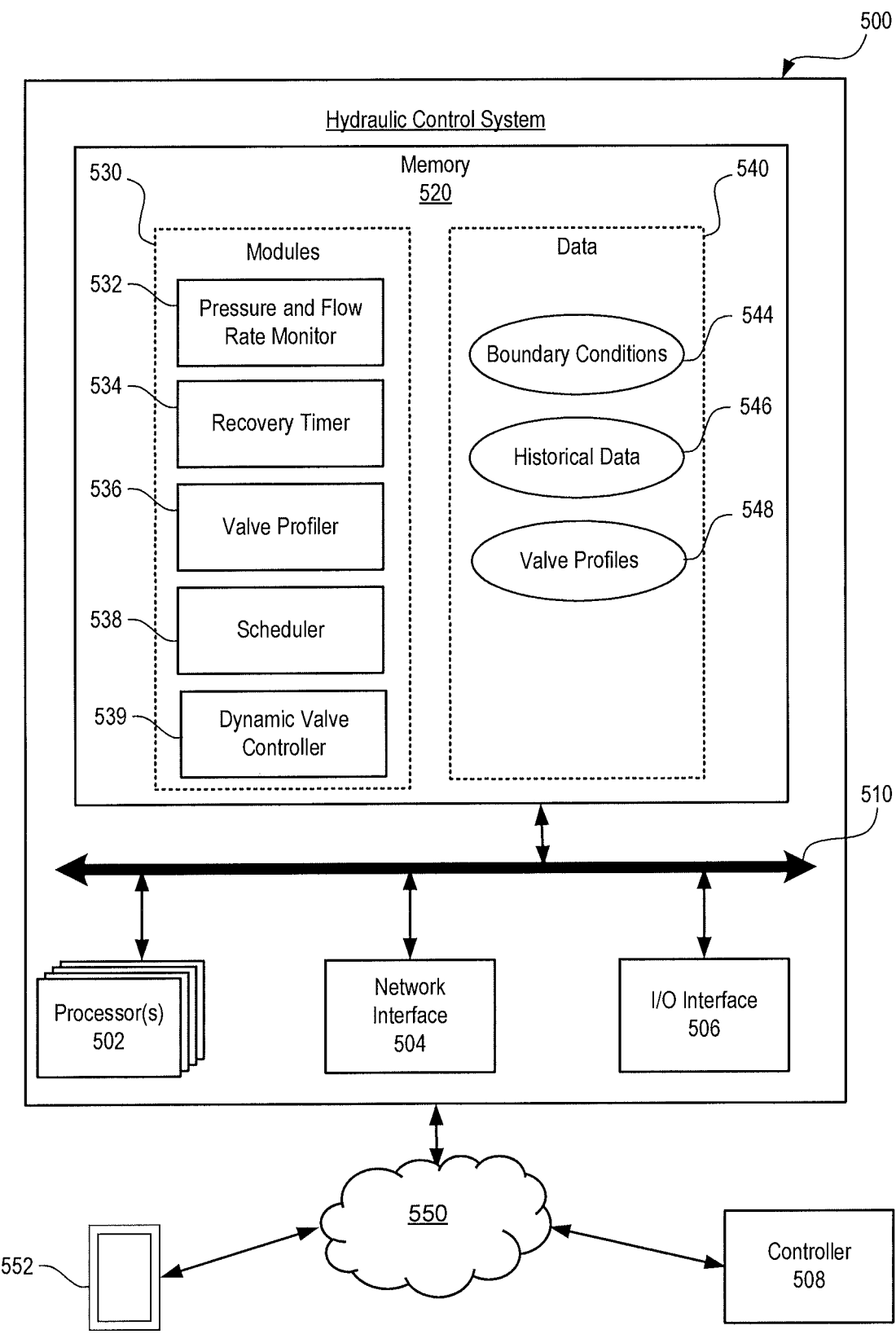
FIG. 5 illustrates a block diagram of a hydraulic control system, according to one embodiment.

FIG. 5 illustrates a block diagram of a hydraulic control system 500 according to one embodiment. In various applications, the hydraulic control system 500 may be used to adaptively direct water to zones of an irrigation site based on pressure, flow rate, time, and predicted behavior. The hydraulic control system 500 can include a memory 520, one or more processors 502, a network interface 504, an input/output interface 506, and a system bus 510.

The one or more processors 502 may include one or more general-purpose devices, such as an Intel®, AMD®, or other standard microprocessor. The one or more processors 502 may include a special purpose processing device, such as ASIC, SoC, SiP, FPGA, PAL, PLA, FPLA, PLD, or other customized or programmable device. The one or more processors 502 can perform distributed (e.g., parallel) processing to execute or otherwise implement functionalities of the presently disclosed embodiments. The one or more processors 502 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The memory 520 may include static RAM, dynamic RAM, flash memory, one or more flip-flops, ROM, CD-ROM, DVD, disk, tape, or magnetic, optical, or other computer storage medium. The memory 520 may include a plurality of program modules 530 and program data 540. The memory 520 may be local to the hydraulic control system 500, as shown, or may be distributed and/or remote relative to the hydraulic control system 500.

The program modules 530 may include all or portions of other elements of the hydraulic control system 500. The program modules 530 may run multiple operations concurrently or in parallel by or on the one or more processors 502. In some embodiments, portions of the disclosed modules, components, and/or facilities are embodied as executable instructions embodied in hardware or in firmware, or stored on a non-transitory computer-readable storage medium. The instructions may comprise computer program code that, when executed by a processor and/or computing device, cause a computing system to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, subsystems and/or the like.

The program modules 530 may comprise a pressure and flow rate monitor 532, a recovery timer 534, a valve profiler 536, a scheduler 538, and a dynamic valve controller 539. The pressure and flow rate monitor 532 may compare pressure and flow rate measurements from an irrigation controller 508 to a target operational range stored as a boundary condition 544 and determine when the pressure and the flow rate are outside the target operational range. When the pressure and the flow rate are determined to be outside the target operational range and additional watering is needed, the dynamic valve controller 539 may identify one or more valves in a closed position of the plurality of valves that when opened would cause the pressure and the flow rate to be maintained within the target operational range. When the pressure and the flow rate are determined to be outside the target operational range, the dynamic valve controller 539 may identify one or more valves in an opened position of the plurality of valves that when closed would cause the pressure and the flow rate to move within the target operational range. The dynamic valve controller 539 may provide instructions to change a position of the one or more identified valves. To determine a predicted pressure and flow rate change for the valves, the dynamic valve controller 539 may receive valve profiles 548 that define recovery time, and changes to flow rate and pressure.

The valve profiles 548 may be generated by the valve profiler 536 and the recovery timer 534. The recovery timer 534 may determine recovery times associated with one or more of the plurality of valves, wherein the recovery time comprises time to stabilize the pressure in the water line. In one embodiment, to determine the recovery times, the recovery timer 534 compares a past pressure measurement and a current pressure measurement after a valve is opened until the past pressure measurement and the current pressure measurement are equal. The recovery times of one or more of the plurality of valves may be determined at a plurality of pressure levels.

The valve profiler 536 may generate the valve profiles 548 based on the recovery times determined by the valve timer and historical data 546. The valve profiles 548 may include recovery time for a given pressure, flow rate, and valve combination. In some embodiments, the profile may include pressure changes and flow rate changes associated with opening the valve with various valve combinations for a given pressure and flow rate. In some embodiments, the profile may include pressure changes and flow rate changes associated with closing the valve with various valve combinations for a given pressure and flow rate. The given pressure and flow rate is the pressure and flow rate before the valve is opened.

In some embodiments, the profiler 536 may update the valve profiles 548 based on feedback from pressure and flow rate monitor 532 and the recovery timer 534 after a valve positioning change has occurred. For example, the profiler 536 may receive flow rate and pressure measurements after a valve positioning change and update the profile based on the measured values and based on the current conditions of the system (e.g., which valves are open, pressure available before opening a valve, type of water source, etc.). In some embodiments, the profiler 536 may compare a predicted pressure and flow rate change for a valve or combination of valves to a measured pressure and flow rate after the position of the valve or combination of valves has changed to determine an effectiveness of the valve or combination of valves. Effectiveness may be based on a difference between the predicted pressure and flow rate change and the measured pressure and flow rate. The effectiveness may become part of the profile, and the a profiler 536 may rank the profiles by effectiveness.

The scheduler 538 may use the valve profiles 548 to generate a watering schedule that meets the boundary conditions 544. The scheduler 538 may generate a set of valve control rules based on pressure changes and flow rate changes measured during operation. The valve control rules vary based on a current combination of valves in use.

The boundary conditions 544 may include a minimum threshold for pressure, a maximum threshold for flow rate, a maximum recovery time limit, scheduling limitations, and/or expected profiles for each valve (e.g., pressure change, flow rate change, recovery time). The scheduler 538 may predict what groups of valves may be used to maximize the water usage while still maintaining pressure above the minimum threshold and flow rates below the maximum threshold. The scheduler 538 may delay turning valves on and off based on recovery time. For example, if a first and a second valve are to be changed, the scheduler 538 may delay providing the instructions to the second valve until after a recovery time associated with the first valve.

Recovery times may be predicted in several ways. In some embodiments, a predicted recovery time of a first valve is based on a current pressure measurement. In some embodiments, to determine the predicted recovery time of the first valve when the current pressure differs from the plurality of pressure levels, the scheduler 538 is further to extrapolate the predicted recovery time at the current pressure using the stored recovery times. In some embodiments, the scheduler 538 is to determine, based on the stored recovery times, a predicted recovery time of a first valve based on a current pressure measurement. In some embodiments, the scheduler 538 is to determine the predicted recovery time of the first valve when the current pressure differs from the plurality of measured pressure levels by extrapolating the predicted recovery time at the current pressure using the stored recovery times.

The dynamic valve controller 539 may make automatic valve changes to maintain the operating conditions within the set boundary conditions 544. If current operating conditions do not align with the boundary conditions 544 such as the pressure falling below the minimum threshold, the dynamic valve controller 539 may use the valve profiles 548 to identify valves to open and/or close to align the current operating conditions with the boundary conditions 544. In some embodiments, the dynamic valve controller 539 may identify valves to open and/or close by determining which combination of valves has the highest ranked effectiveness for a desired pressure and flow rate change.

In some embodiments, the dynamic valve controller 539 may request that the hydraulic system receive water from an additional water source when the pressure measurement and the flow rate measurement are outside of the target operational range. In some embodiments, the dynamic valve controller 539 may not take corrective actions until pressure and flow rate stabilization has been reached. The dynamic valve controller 539 can generate an error message to warn an operator of a failure if the time to stabilize exceeds a time limit.

The memory 520 may also include the program data 540. Data generated by the hydraulic control system 500, such as by the program modules 530 or other modules, may be stored on the memory 520, for example, as stored program data 540. The program data 540 may be organized as one or more databases.

The input/output interface 506 may facilitate user interaction with one or more input devices and/or one or more output devices. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, speaker, signal line, or other hardware with accompanying firmware and/or software.

The network interface 504 may facilitate communication with other computing devices and/or networks and/or other computing and/or communications networks. According to the figure, the network interface 504 may communicate with a network 550. The network interface 504 may be equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the network interface 504 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth.

The system bus 510 may facilitate communication and/or interaction between the other components of the hydraulic control system 500, including the one or more processors 502, the memory 520, the input/output interface 506, and the network interface 504.

The network interface 504 may allow the hydraulic control system 500 to communicate with the network 550 in order to transmit and receive information to and from one or more personal electronic devices (PEDs) 552 and to and from the irrigation controller 508 of a hydraulic system. The PED 552 may be a smartphone, tablet, computer, smartwatch, or other electronic device. The network interface 504 may send a failure warning or receive boundary conditions from the PED 552. The irrigation controller 508 may be a controller that collects readings from sensors within the various components of the hydraulic system. Further, the irrigation controller 508 may store tasks for the hydraulic system (such as switching commands for various valves and pumps of the hydraulic system). In some embodiments, a user may enter boundary conditions using the irrigation controller 508.

In one embodiment, the hydraulic control system 500 may allow a user to store and/or send commands to the irrigation controller 508 to modify the operation of the hydraulic system.

Figure 6:
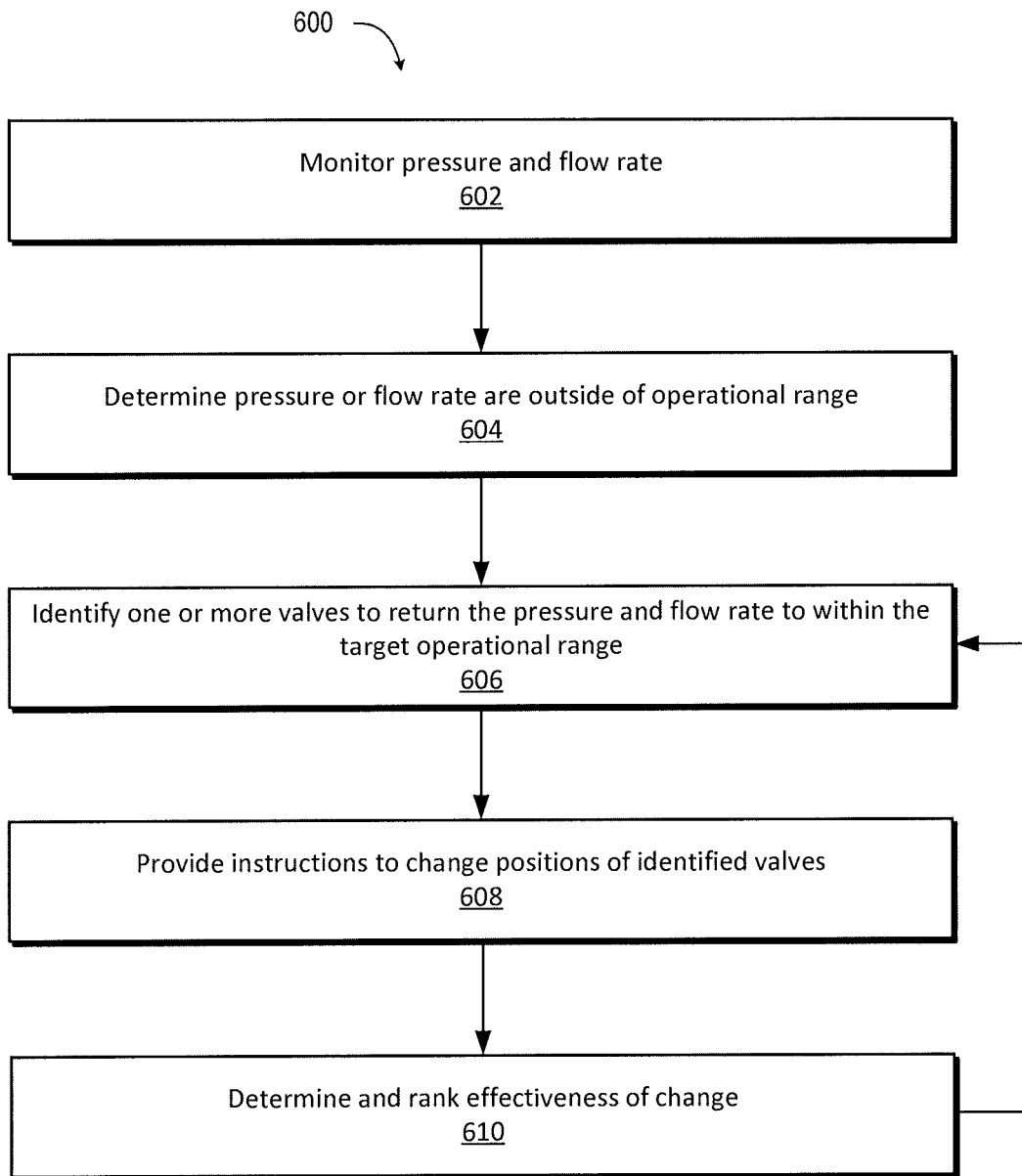
FIG. 6 is a method for controlling a hydraulic system, according to one embodiment.

FIG. 6 is a method 600 for controlling a hydraulic system. The method 600 may be executed by a hydraulic control system as shown in FIGS. 4-5 or a controller as shown in FIGS. 1, 4, and 5. For simplicity, FIG. 6 is described with reference to a controller executing the method 600. A controller may monitor 602 a pressure in a water line via a pressure sensor, and a flow rate in a water line via a flow meter. The controller may determine 604 when the pressure and the flow rate are outside of a target operational range.

When the pressure and the flow rate are determined to be outside of the target operational range, the controller may identify 606 one or more valves that are associated with a change in pressure and a change in flow rate sufficient to return the pressure and the flow rate to within the target operational range. In some embodiments, to assist with identifying valves to return the pressure and flow rate to the target operational range, the controller may create a profile for each of the one or more valves based on the monitored pressure and flow rate during operation. The profile may include a recovery time, an individual flow rate of an associated valve, a combined flow rate of a combination of valves including an associated valve, a change in pressure caused by a valve opening or closing, or a change in pressure caused by a combination of valves including an associated valve opening or closing. The individual flow rate may define the change in flow rate when the valve is opened and closed. The combined flow rate may define the change in flow rate when the valve is opened and closed while other valves are opened. The recovery time may be dependent on a current pressure measurement.

The controller may further provide 608 instructions to change a position of the one or more identified valves. When the valves open or close based on the instructions, the controller may determine if the changes were sufficient to return the pressure and the flow rate to within the target operational range, or if additional valves need to be turned off.

In some embodiments, the method 600 may include a feedback loop to more accurately predict pressure and flow rate changes in future valve position changes. For example, the method 600 may include determining and/or ranking 610 effectiveness of a change by comparing the predicted pressure and flow rate change to a measured pressure and flow rate after the position of the one or more identified valves has changed to determine an effectiveness of the one or more identified valves. The effectiveness may be based on a difference between the predicted pressure and flow rate change and the measured pressure and flow rate. The effectiveness of the one or more identified valves may be ranked in relation to previous valve positional changes.

The ranking, effectiveness, and/or actual measurements may be used in identifying future valve changes to maintain the pressure and flow rate within the target operational range. For example, a future identification of one or more valves to return the pressure and flow rate to within the target operational range may be performed by determining which combination of valves has the highest ranked effectiveness for a desired pressure and flow rate change.

Example Embodiments

The following are some example embodiments within the scope of the disclosure. In order to avoid complexity in providing the disclosure, not all of the examples listed below are separately and explicitly disclosed as having been contemplated herein as combinable with all of the others of the examples listed below and other embodiments disclosed hereinabove. Unless one of ordinary skill in the art would understand that these examples listed below (and the above disclosed embodiments) are not combinable, it is contemplated within the scope of the disclosure that such examples and embodiments are combinable.

Example 1. A hydraulic control system comprising: a pressure sensor to measure a pressure in a water line; a flow meter to measure a flow rate in the water line; a plurality of valves to control water flow; and a processing unit in communication with the pressure sensor, the flow meter, and the plurality of valves, wherein the processing unit is to: monitor the pressure and the flow rate; determine when the pressure is above and below a minimum target threshold and when the flow rate is above and below a maximum target threshold; when the pressure is determined to be above the minimum target threshold and the flow rate is determined to be below the maximum target threshold, identify one or more valves in a closed position of the plurality of valves that when opened would maintain the pressure above the minimum target threshold and the flow rate below the maximum target threshold; when the pressure is determined to be below the minimum target threshold or the flow rate is determined to be above the maximum target threshold, identify one or more valves in an opened position of the plurality of valves that when closed would cause one or more of the pressure to be increased above the minimum target threshold and the flow rate to be reduced below the maximum target threshold; and provide instructions to change a position of the one or more identified valves.

Example 2. The hydraulic control system of example 1, wherein the processing unit is further to determine recovery times associated with one or more of the plurality of valves, wherein the recovery time comprises time to stabilize one or more of the pressure and the flow rate in the water line.

Example 3. The hydraulic control system of example 2, wherein the one or more identified valves comprise a first and a second valve, and wherein the processing unit provides the instructions to the first valve and delays providing the instructions to the second valve until after a recovery time associated with the first valve.

Example 4. The hydraulic control system of example 2, wherein the processing unit is further to: cause the recovery times of one or more of the plurality of valves to be stored on a memory device; and associate the recovery times to pressure measurements.

Example 5. The hydraulic control system of example 4, wherein the processing unit is further to determine, based on the stored recovery times, a predicted recovery time of a first valve based on a slope of pressure measurements.

Example 6. The hydraulic control system of example 5, wherein to determine the predicted recovery time of the first valve when the current pressure measurement differs from the pressure measurements associated with the stored recovery times, the processing unit is further to extrapolate the predicted recovery time at the current pressure using the stored recovery times.

Example 7. The hydraulic control system of example 1, wherein the processing unit is further to: compare a predicted pressure and flow rate change to a measured pressure and flow rate change after a valve positional change of the one or more identified valves, the comparison to determine an effectiveness of the change in position of the one or more identified valves, wherein the effectiveness is based on a difference between the predicted pressure and flow rate change and the measured pressure and flow rate change; and rank the effectiveness of the valve positional change of the one or more identified valves and previous valve positional changes, wherein the processing unit identifies future valve positional changes to maintain the pressure and flow rate within the minimum target threshold and maximum target threshold by determining which combination of valves has the highest ranked effectiveness for a desired pressure and flow rate change.

Example 8. A method for controlling a hydraulic system, the method comprising: monitoring a pressure in a water line via a pressure sensor, and a flow rate in a water line via a flow meter; determining when one or more of the pressure and the flow rate are outside of a target operational range; when one or more of the pressure and the flow rate are determined to be outside of the target operational range, identifying one or more valves that are associated with a predicted pressure and flow rate change sufficient to return the pressure and the flow rate to within the target operational range; and providing instructions to change a position of the one or more identified valves.

Example 9. The method of example 8, further comprising creating a profile for each of the one or more valves based on the monitored pressure and flow rate during operation.

Example 10. The method of example 9, wherein each profile comprises a recovery time, wherein the recovery time comprises a function dependent on at least one of a current pressure and flow measurement.

Example 11. The method of example 9, wherein each profile comprises an individual flow rate of a valve associated with the profile.

Example 12. The method of example 9, wherein each profile comprises a combined flow rate of a combination of valves including a valve associated with the profile.

Example 13. The method of example 9, wherein each profile comprises a change in pressure caused by a combination of valves opening, the combination of valves comprising a valve associated with the profile.

Example 14. The method of example 8, further comprising: comparing the predicted pressure and flow rate change to a measured pressure and flow rate after the position of the one or more identified valves has changed to a new position to determine an effectiveness of the new position of the one or more identified valves, wherein the effectiveness is based on a difference between the predicted pressure and flow rate change and the measured pressure and flow rate; and ranking the effectiveness of the new position of the one or more identified valves in relation to previous valve positions, wherein identifying future valve changes to maintain the pressure and flow rate within the target operational range is performed by determining which combination of valve positions has the highest ranked effectiveness for a desired pressure and flow rate change.

Example 15. A hydraulic control system comprising: a memory to store predicted pressure changes and predicted flow rate changes for valve positional changes of a hydraulic system; and a processing unit to: receive a pressure measurement for a water line of a hydraulic system from a pressure sensor, and a flow rate measurement for a water line of the hydraulic system from a flow meter; compare the pressure measurement and the flow rate measurement to a target operational range; correlate pressure changes and flow rate changes with a plurality of valves of the hydraulic system; identify, when the pressure measurement and the flow rate measurement are outside of the target operational range, one or more valves of the plurality of valves correlated with predicted pressure changes and predicted flow rate changes sufficient to return the pressure measurement and the flow rate measurement to within the target operational range; and provide instructions to change a position of the one or more identified valves.

Example 16. The hydraulic control system of example 15, wherein the processing unit is further to cause the processor to perform operations to generate a set of valve control rules based on pressure changes and flow rate changes measured during operation.

Example 17. The hydraulic control system of example 16, wherein the valve control rules vary based on a current combination of valves in use.

Example 18. The hydraulic control system of example 15, wherein the processor is further to request that the hydraulic system receive water from an additional water source when the pressure measurement and the flow rate measurement are outside of the target operational range.

Example 19. The hydraulic control system of example 15, wherein the processor is further to compare a time to stabilize the hydraulic system after a valve changes position to a time limit.

Example 20. The hydraulic control system medium of example 19, wherein the processor is further to generate an error message for the valve if the time to stabilize is greater than the time limit.

Example 21. The hydraulic control system of example 15, wherein identifying the one or more valves includes calculating a predicted flow rate for a valve at a current pressure measurement based on a prior flow rate measurement for the valve at a prior pressure measurement.

Example 22. A non-transitory computer-readable medium storing instructions that, when executed by a processor, cause the processor to perform operations to: receive a pressure measurement for a water line of a hydraulic system from a pressure sensor, and a flow rate measurement for a water line of the hydraulic system from a flow meter; compare the pressure measurement and the flow rate measurement to a target operational range; correlate pressure changes and flow rate changes with a plurality of valves of the hydraulic system; identify, when the pressure measurement and the flow rate measurement are outside of the target operational range, one or more valves of the plurality of valves correlated with predicted pressure changes and predicted flow rate changes sufficient to return the pressure measurement and the flow rate measurement to within the target operational range; and provide instructions to change a position of the one or more identified valves.

Example 23. The non-transitory computer-readable medium of example 22, wherein the instructions are further to cause the processor to perform operations to generate a set of valve control rules based on pressure changes and flow rate changes measured during operation.

Example 24. The non-transitory computer-readable medium of example 23, wherein the valve control rules vary based on a current combination of valves in use.

Example 25. The non-transitory computer-readable medium of example 22, wherein the instructions are further to cause the processor to request that the hydraulic system receive water from an additional water source when the pressure measurement and the flow rate measurement are outside of the target operational range.

Example 26. The non-transitory computer-readable medium of example 22, wherein the instructions are further to cause the processor to compare a time to stabilize the hydraulic system after a valve changes position to a time limit.

Example 27. The non-transitory computer-readable medium of example 26, wherein the instructions are further to generate an error message for the valve if the time to stabilize is greater than the time limit.

Example 28. The non-transitory computer-readable medium of example 22, wherein identifying the one or more valves includes calculating a predicted flow rate for a valve at a current pressure measurement based on a prior flow rate measurement for the valve at a prior pressure measurement.

This disclosure has been made with reference to various embodiments, including the best mode. However, those skilled in the art will recognize that changes and modifications may be made to the embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The scope of the present invention should, therefore, be determined by the claims.

The invention claimed is:

1. A non-transitory computer-readable storage medium storing instructions thereon that, when executed by a hydraulic system controller for a hydraulic system, configure the hydraulic system controller to:
    determine when a water flow characteristic of water in a water line are outside of a target operational range, in which the water flow characteristic includes one or both pressure and flow rate;
    in response to a determination that the water flow characteristic is outside of the target operational range, identify one or more valves that are associated with a predicted water flow characteristic change sufficient to return the water flow characteristic to within the target operational range;
    provide instructions to change a position of the one or more identified valves;
    compare the predicted water flow characteristic change to a measured water flow characteristic after the position of the one or more identified valves has changed to a new position to determine an effectiveness of the new position of the one or more identified valves, in which the effectiveness is based on a difference between the predicted water flow characteristic change and the measured water flow characteristic; and
    rank the effectiveness of the new position of the one or more identified valves in relation to previous valve positions so as to determine which combination of valve positions has a highest ranked effectiveness for a desired water flow characteristic change and thereby identify future valve changes to maintain the water flow characteristic within the target operational range.

2. The non-transitory computer-readable storage medium of claim 1, in which the instructions further configure the hydraulic system controller to determine a recovery time associated with one or more of identified valves, in which the recovery time comprises a time to stabilize the water flow characteristic.

3. The non-transitory computer-readable storage medium of claim 2, in which the instructions further configure the hydraulic system controller to:
    cause the recovery time of one or more of the identified valves to be stored on a memory device; and
    associate the recovery time to a pressure measurement.

4. The non-transitory computer-readable storage medium of claim 3, in which the instructions further configure the hydraulic system controller to determine, based on a stored recovery time, a predicted recovery time of a first valve based on a slope of pressure measurements.

5. The non-transitory computer-readable storage medium of claim 4, in which the instructions further configure the hydraulic system controller to extrapolate the predicted recovery time at a current pressure measurement using the stored recovery time so as to determine the predicted recovery time of the first valve when the current pressure measurement differs from pressure measurements associated with stored recovery times.

6. The non-transitory computer-readable storage medium of claim 2, in which the instructions further configure the hydraulic system controller to:
    cause the recovery time of one or more of the identified valves to be stored on a memory device; and
    associate the recovery time to a water flow measurement.

7. The non-transitory computer-readable storage medium of claim 6, in which the instructions further configure the hydraulic system controller to determine, based on a stored recovery time, a predicted recovery time of a first valve based on a slope of flow measurements.

8. The non-transitory computer-readable storage medium of claim 4, in which the instructions further configure the hydraulic system controller to extrapolate the predicted recovery time at a current flow measurement using the stored recovery time so as to determine the predicted recovery time of the first valve when the current flow measurement differs from flow measurements associated with stored recovery times.

9. The non-transitory computer-readable storage medium of claim 1, in which the instructions further configure the hydraulic system controller to create a profile for the one or more identified valves based on the measured water flow characteristic during operation.

10. The non-transitory computer-readable storage medium of claim 9, in which the operation includes at least partly opening or closing a valve.

11. The non-transitory computer-readable storage medium of claim 9, in which the profile comprises an individual pressure associated with a valve.

12. The non-transitory computer-readable storage medium of claim 9, in which the profile comprises a combined pressure associated with a combination of valves.

13. The non-transitory computer-readable storage medium of claim 9, in which the profile comprises an individual flow rate associated with a valve.

14. The non-transitory computer-readable storage medium of claim 9, in which the profile comprises a combined flow rate associated with a combination of valves.

15. The non-transitory computer-readable storage medium of claim 1, in which the instructions further configure the hydraulic system controller to generate a set of valve control rules based on one or both pressure changes and flow rate changes measured during operation.

16. The hydraulic control system of claim 15, in which the set of valve control rules vary based on a current combination of valves in use.

17. The non-transitory computer-readable storage medium of claim 1, in which the instructions further configure the hydraulic system controller to request that the hydraulic system receive water from an additional water source when the water flow characteristic is outside of the target operational range.

18. The non-transitory computer-readable storage medium of claim 1, in which the instructions further configure the hydraulic system controller to compare a time to stabilize the hydraulic system after a valve changes position according to a time limit.

19. The non-transitory computer-readable storage medium of claim 18, in which the instructions further configure the hydraulic system controller to generate an error message for the valve if the time to stabilize is greater than the time limit.

20. The non-transitory computer-readable storage medium of claim 1, in which the instructions further configure the hydraulic system controller to calculate a predicted flow rate for a valve at a current pressure measurement based on a prior flow rate measurement for the valve at a prior pressure measurement.

* * * * *